(12) United States Patent
Thevenon et al.

(10) Patent No.: US 8,284,397 B2
(45) Date of Patent: Oct. 9, 2012

(54) INCLINED-SLIT SPECTROGRAPH

(75) Inventors: Alain Thevenon, Bretigny-sur-Orge (FR); Viviane Millet, Linas (FR); Pierre-André Corde, Champigny-sur-Marne (FR)

(73) Assignee: Horiba Jobin Yvon Sas (FR)

( * ) Notice: Subject to any disclaimer, the term of this patent is extended or adjusted under 35 U.S.C. 154(b) by 394 days.

(21) Appl. No.: 12/527,943

(22) PCT Filed: Feb. 27, 2008

(86) PCT No.: PCT/FR2008/050334
§ 371 (c)(1),
(2), (4) Date: Jan. 14, 2010

(87) PCT Pub. No.: WO2008/119906
PCT Pub. Date: Oct. 9, 2008

(65) Prior Publication Data
US 2010/0118299 A1    May 13, 2010

(30) Foreign Application Priority Data
Feb. 28, 2007   (FR) ..................... 07 53565

(51) Int. Cl.
*G01J 3/40* (2006.01)
(52) U.S. Cl. .................................... 356/305
(58) Field of Classification Search .......... 356/305, 356/326, 328, 330, 334
See application file for complete search history.

(56) References Cited

U.S. PATENT DOCUMENTS
4,633,078 A    12/1986  Ferber
5,719,672 A *   2/1998  Chien ............... 356/328
6,597,451 B1 *  7/2003  Araki ............... 356/328

FOREIGN PATENT DOCUMENTS
DE        19611218 A1    1/1997
* cited by examiner

*Primary Examiner* — Tarifur Chowdhury
*Assistant Examiner* — Abdullahi Nur
(74) *Attorney, Agent, or Firm* — Brooks Kushman P.C.

(57) ABSTRACT

An inclined-slit spectrograph includes a light source, an inlet slit, a grating and a detector including window through which the light beam diffracted by the grating is transmitted with part of the diffracted light beam generating reflections on the window or between the window and the sensitive surface of the detector. A rectangular inclined inlet slit compensates for spectral resolution losses.

9 Claims, 3 Drawing Sheets

INCLINED-SLIT SPECTROGRAPH

The present invention relates to an inclined-slit spectrograph.

The prior-art grating spectrographs comprise a light source, an inlet slit, a grating which may be a concave holographic grating, and a detector. FIGS. 1 and 2 show an example of grating spectrograph according to the prior art. FIG. 1 shows a 3D representation of the spectrograph and FIG. 2 corresponds to a top view.

The concave holographic gratings have an optical surface in which a great number of lines (up to 6000 lines/mm) have been marked, which serve to diffract any beam of incident rays. They preferentially operate in reflection.

The concave holographic gratings are usually aberration-corrected.

The detector may be a detector of the PDA-type (Photodiode Array) or of the CCD-type (Charge Coupled Device). The material used for the detector may be silicon or InGaAs, for example, with a very reflective surface.

It is possible to use a cooled detector. Such a cooled detector comprises a window that protects the detector's sensitive surface. Such window is essential to avoid that condensation phenomena occur on the detector's surface.

The multiple reflections produced in the window and between the window's faces and the detector's surface significantly impair the signal-to-noise ratio, superimposing parasitic spectra to the spectrum to be measured.

To reduce influence of such phenomena on the spectrograph performance, it is known to use a calculated grating, determined so that the spectrum it produces is inclined. Consequently, the parasitic beams reflected on the sensitive surface of the detector do not return to the grating, which avoid occurrence of re-diffraction phenomena causing parasitic light problems that harm the instrument performance.

Also known is the method consisting in inclining the detector around an axis parallel to the spectrum, as illustrated in FIGS. 1 and 2, so that the multiple reflections between the detector and the window's faces go partially or fully outside the sensitive surface of the detector in the direction perpendicular to the dispersion. Generally, this action impairs the spectral resolution of the instrument.

The two preceding methods, each implementing an inclination means, may be used either separately or jointly.

They improve the background noise of the spectrograph. On the other hand, they significantly impair the spectral resolution of the apparatus.

It is also known to use an inclined order-selection filter in front of the detector so as to avoid a new contribution to parasitic spectra.

Accordingly, the object of the present invention is to provide a solution to compensate for the spectral resolution losses of the spectrograph.

To that end, the invention relates to an inclined-slit spectrograph comprising:
 a light source suitable for emitting a light beam,
 an inlet slit suitable for transmitting a part of the light beam emitted by the light source and generating a transmitted light beam,
 a grating comprising lines and suitable for diffracting the light beam transmitted through the inlet slit and generating a diffracted light beam and a spectrum in an image plane (X', Y'),
 a detector suitable for detecting the light beam diffracted by the grating, said detector comprising a window through which the light beam diffracted by the grating is transmitted, wherein a part of the diffracted light beam generates reflections on the window or between said window and the sensitive surface of the detector contained in a detection plane (X", Y"),
 at least one inclination means suitable for avoiding parasitic spectra.

According to the invention, the inclined-slit spectrograph comprises a compensation means suitable for compensating for the spectral resolution losses generated by the inclination means. The compensation means comprises the inlet slit, which is an inclined inlet slit of rectangular shape.

In various possible embodiments, the present invention also relates to the features that will appear from the following description and that should be considered either alone or in any technically possible combination:
 the inclined inlet slit is arranged between the light source and the grating,
 the inclined inlet slit is inclined in a plane (X, Y) that is perpendicular to the direction of the light beam emitted by the light source,
 the inclined inlet slit is inclined by an angle ($\theta$) with respect to the lines of the grating, the angle ($\theta$) being greater than 0° and smaller than 90°,
 the inclined-slit spectrograph comprises a selector filter arranged between the grating and the detector,
 the inclination means suitable for avoiding parasitic spectra comprises the detector, which is an inclined detector, said inclined detector being inclined by an angle ($\alpha$) so that the detection plane (X", Y") of said detector is inclined by an angle ($\alpha$) with respect to the image plane (X', Y') of the grating, and said angle ($\alpha$) being defined in the plane (Y", Z"), orthogonal to the detection plane (X", Y"),
 the angle ($\alpha$) of the inclined detector is greater than 0° and smaller than 45°,
 the inclination means suitable for avoiding parasitic spectra comprises the grating, which is a calculated grating, determined so that the spectrum it produces is inclined by an angle ($\beta$) with respect to the detection plane (X", Y") of the detector,
 the inclination means suitable for avoiding parasitic spectra comprises:
  the detector, which is an inclined detector, said inclined detector being inclined by an angle ($\alpha$) so that the detection plane (X", Y") of said detector is inclined by an angle ($\alpha$) with respect to the image plane (X', Y') of the grating, and said angle ($\alpha$) being defined in the plane (Y", Z"), orthogonal to the detection plane (X", Y"), and
  the grating, which is a calculated grating, determined so that the spectrum it produces is inclined by an angle ($\beta$) with respect to the detection plane (X", Y") of the detector.

The invention will now be described in more details with reference to the appended drawings, in which:

FIG. 1 shows a 3D representation of a concave-holographic-grating spectrograph according to the prior art. FIG. 2 shows the corresponding top view.

Figure 1:
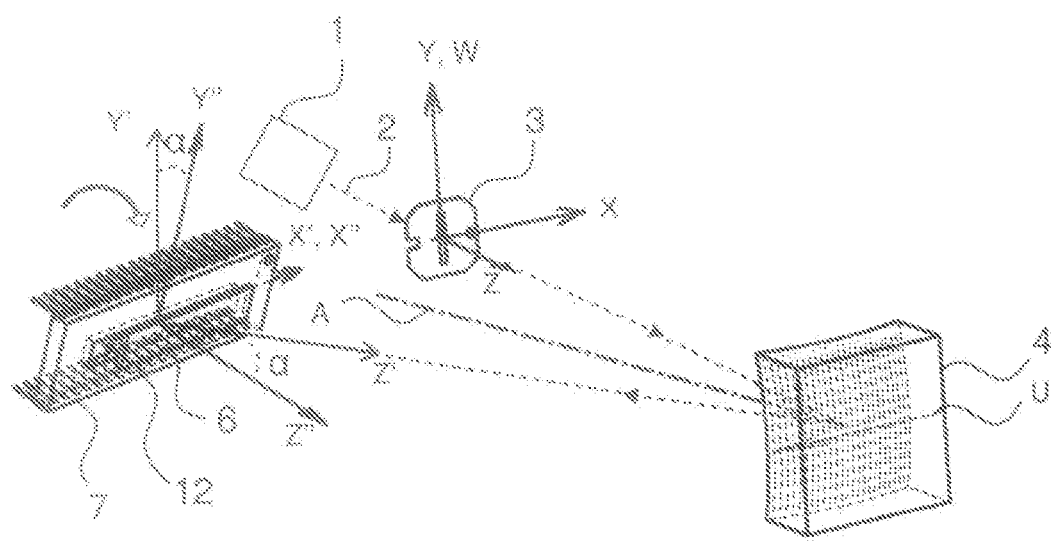
FIGS. 1 and 2 are a 3D representation and a top view, respectively, of a concave-holographic-grating spectrograph having a detector inclined by an angle ($\alpha$) according to the prior art.

Such a spectrograph comprises a light source 1 which emits a light beam finding its way to an inlet slit 3 along a direction 2 parallel to an axis Z. The inlet slit 3 is defined according to the coordinate system (X, Y, Z). The inlet slit 3 is located in the plane (X, Y).

As understood herein, the inlet slit 3 is an opening formed in a support or any other means blocking a part of the light beam emitted by the light source 1 and transmitting the other part of this beam.

The light source 1 illuminates almost uniformly the inlet slit 3, either directly or through a coupling optic.

A transmitted light beam exits from the inlet slit 3.

The light beam transmitted by the inlet slit 3 is incident onto a grating 4, which may be a concave holographic grating or the like. A diffracted light beam and a spectrum in an image plane (X', Y') are obtained. The image plane is defined according to the coordinate system (X', Y', Z'), where the axis Z' is orthogonal to the image plane (X', Y').

The inlet slit 3 is rectangular and extends longitudinally along a longitudinal axis Y. The grating 4 is a concave holographic grating. The lines of this concave holographic grating 4 are curved and arranged one after the other according to an axis U. The normal W to this alignment axis U and to the axis Z is parallel to the longitudinal axis Y of the inlet slit 3. In other words, the normal W is perpendicular to the plane (U, Z). The concave holographic grating 4 has an axis A normal to the axis U and crossing the apex of the curved surface of the grating.

An order-selection filter may possibly be inserted in the beam after the grating 4.

The light beam diffracted by the grating 4 is detected by a detector 7, which may be a multi-channel detector. The detector 7 is arranged in the path of the light beam diffracted by the grating 4 so as to intercept the spectrum contained in the image plane (X', Y').

The detector 7 is defined according to a coordinate system (X", Y", Z"). The plane (X", Y") represents the detection plane, which is orthogonal to the axis Z".

The detector 7 comprises a sensitive surface (not shown), which is located in the detection plane (X", Y") of the detector 7.

Figure 2:
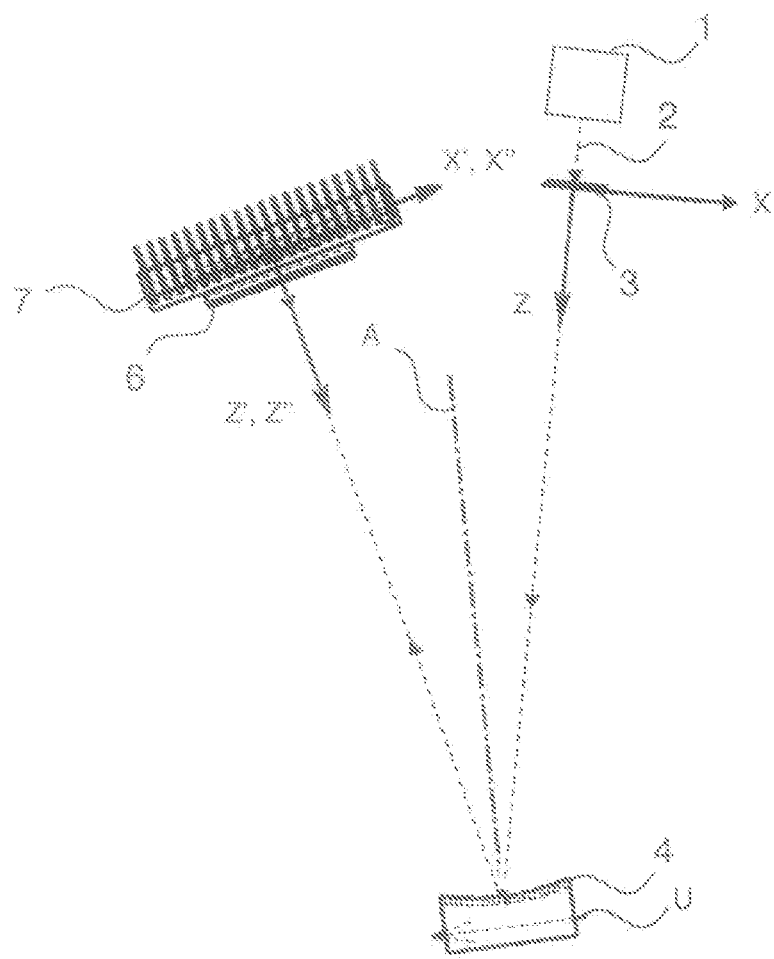

For the purpose of diagram simplification, only the front face of the detector 7 is shown in FIGS. 1 and 2, and those that follow. This front face comprises a detector opening 12 through which the light beam diffracted passes before arriving onto the sensitive surface of the detector 7.

The concave-holographic-grating spectrograph may comprise optical means such as mirrors for reflecting and focusing the light beam transmitted by the slit 3, the diffracted beam and possibly the dispersed beam.

The detector 7 often comprises a window 6 through which the light beam diffracted by the grating 4 is transmitted.

A part of the diffracted light beam generates multiple reflections on the window 6 or between said window and the sensitive surface of the detector 7.

To eliminate these reflections, it is known, as above-mentioned, to use at least one inclination means suitable for avoiding superimposition of parasitic spectra to the spectrum to be measured.

These prior-art inclination means consist in inclining either the spectrum to be measured, i.e. the image plane (X', Y') of the grating 8, with respect to the detection plane (X", Y") of the detector 7, or the detection plane (X", Y") of the detector 7.

The inclination means may comprise an inclined detector 7, as shown in FIGS. 1 and 2.

The inclined detector 7 is inclined so that the detection plane (X", Y") of the latter is inclined by an angle ($\alpha$) with respect to the image plane (X', Y') of the grating. The angle ($\alpha$) is defined in the plane (Y", Z"), orthogonal to the detection plane (X", Y").

As understood herein, the inclination of the detector is also the inclination of the sensitive surface of the detector.

In FIG. 1, the axis Z" is inclined by an angle ($\alpha$) with respect to the axis Z' and the axis Y" is inclined by an angle ($\alpha$) with respect to the axis Y'.

This inclination by an angle ($\alpha$) avoids that the reflected beams return to the grating 4.

Likewise, it is possible to use as an inclination means a calculated grating 8, determined so that the spectrum it produces is inclined by an angle ($\beta$) with respect to the detection plane (X", Y") of the detector 7. The produced spectrum is contained in the image plane (X', Y') of the calculated grating 8.

These two inclination means may be used either separately or jointly.

They improve the background noise of the spectrograph. On the other hand, they significantly impair the spectral resolution of the apparatus.

Figure 3:
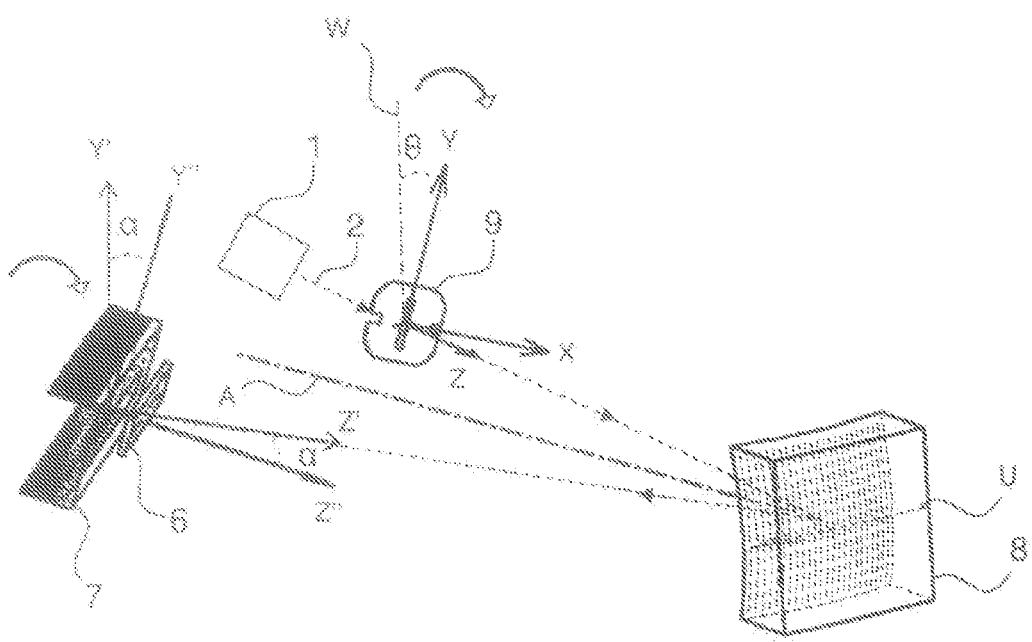
FIGS. 3 and 4 are a 3D representation and a top view, respectively, of an inclined-slit spectrograph according to one embodiment of the invention.
Figure 4:
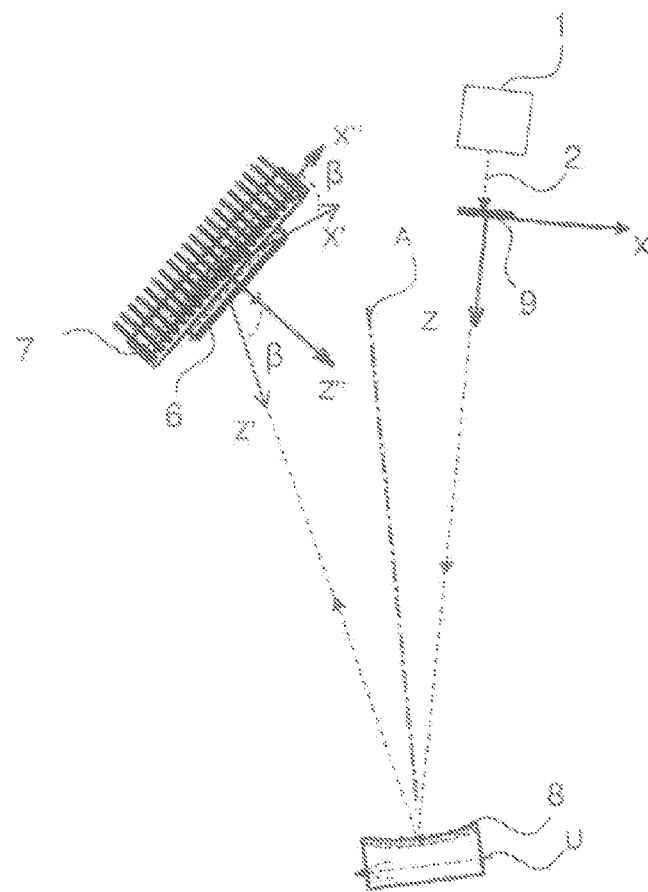

In order to solve this problem, the invention provides, as shown in FIGS. 3 and 4, an inclined-slit spectrograph comprising a compensation means suitable for compensating for the spectral resolution losses generated by the inclination means.

In this example, the two inclination means are used jointly.

FIGS. 3 and 4 correspond to a 3D representation and a top view, respectively, of an inclined-slit spectrograph.

To make the understanding of FIG. 3 easier, only the angle ($\alpha$) is shown.

FIG. 4 shows only the angle ($\beta$) because the angle ($\alpha$) is not visible in the plane of the sheet.

The spectral-resolution-loss compensation means comprises an inclined inlet slit 9 arranged between the light source 1 and the calculated grating 8.

The inclined inlet slit 9 is inclined in the plane (X, Y) perpendicular to the direction 2 of the light beam emitted by the light source 1. The inclined inlet slit 9 undergoes a rotation around the axis Z.

Indeed, the inclined inlet slit 9 is inclined with respect to the lines of the grating 4, which are aligned according to an alignment axis U.

More precisely, the longitudinal axis Y of the inclined inlet slit 9 is inclined by an angle ($\theta$) with respect to the normal W of the plane (U, Z).

In other words, the inclined inlet slit 9 is inclined by an angle ($\theta$) with respect to the initial position, shown in FIG. 1, where it is not inclined. The angle ($\theta$) is greater than 0° and smaller than 90°.

Still in other words, if the lines of the grating are projected onto the projection plane parallel to the alignment axis U, the projected lines are also aligned according to the alignment axis U and the longitudinal axis Y of the inclined inlet slit 9 is inclined by the angle ($\theta$) with respect to the lines projected onto the projection plane.

The inclined detector 7 is inclined by an angle ($\alpha$) so that the detection plane (X", Y") of the detector 7 is inclined by an angle ($\alpha$) with respect to the image plane (X', Y') of the grating. In FIG. 3, the detector 7 is inclined downward. It may also be inclined upward.

The angle ($\alpha$) of the inclined detector (7) is greater than 0° and smaller than 45°.

The inclined inlet slit 9 makes it possible to compensate for the resolution losses introduced by the detector 7 inclined by an angle ($\alpha$) and the spectrum inclined by an angle ($\beta$).

In other possible embodiments, the inclined inlet slit 9 may be used when the above-mentioned inclination means are used separately.

Figure 5:
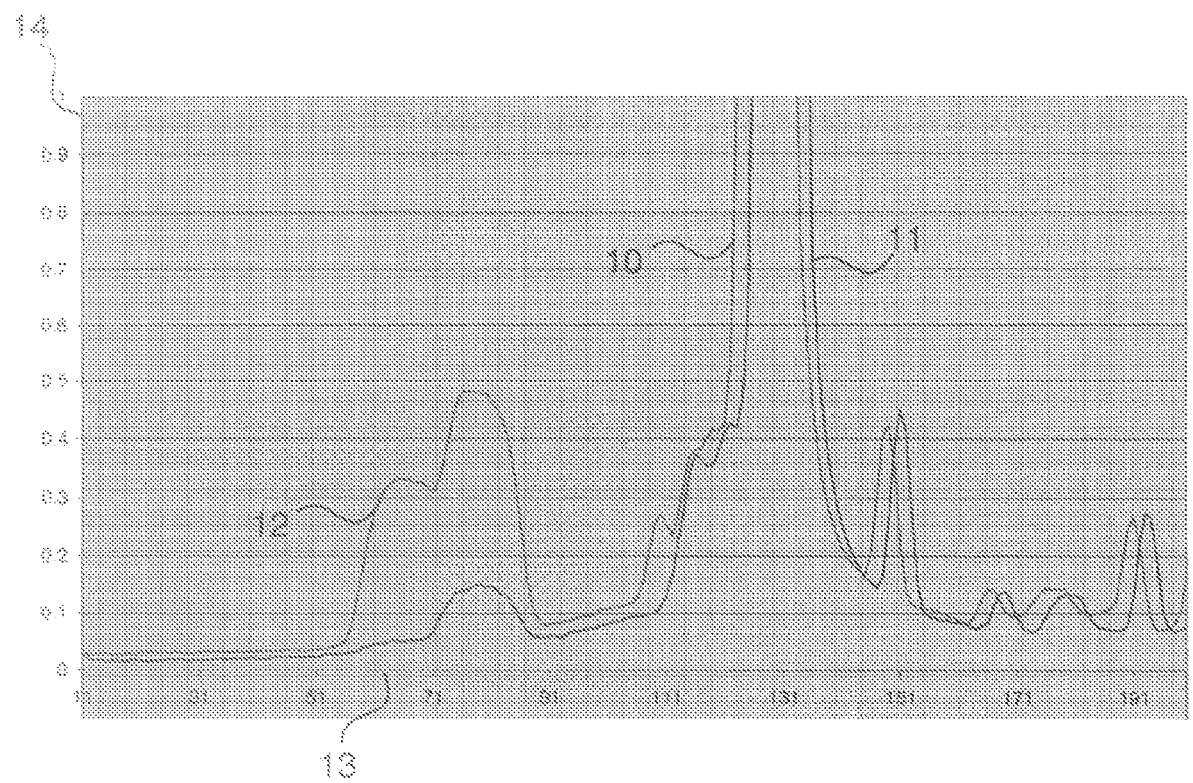
FIG. 5 shows two spectra, one being measured by a non-inclined detector and the other being measured by an inclined detector associated with an inclined slit.

FIG. 5 shows two spectra 10, 11. The abscissa axis 13 represents pixels that, in fact, correspond to wavelengths, and the ordinate axis 14 represents the signal strength, as a percentage.

The curve 10 corresponds to the spectrum measured by a non-inclined detector 7.

The spectrum 10 shows a parasitic peak 12 coming from reflections of the beam to be measured between the window of the detector and the detection surface of the detector.

The curve 11 corresponds to a spectrum measured by a detector 7 inclined by an angle ($\alpha$) of 20° associated with a slit inclined by an angle ($\theta$) of 5°. The parasitic peak 12 has almost disappeared, with no or very few spectral resolution losses.

The following results are given for a wavelength of 800 nm. The bandpass of the measured beam, when the detector 7 is not inclined, is of 1.58 nm. It is of 3.98 nm when the detector 7 is inclined and when the slit 3 is not inclined, and it is of 1.68 nm when the detector 7 and the slit 9 are inclined.

Therefore, the invention makes it possible to compensate, in a simple and cheap manner, for the spectral resolution losses of an inclined-slit spectrograph.

The invention claimed is:

1. An inclined-slit spectrograph comprising:

a light source suitable for emitting a light beam, an inlet slit having a rectangular shape suitable for transmitting a part of the light beam emitted by the light source and generating a transmitted light beam, the inlet slit being inclined and rotated relative to an axis perpendicular to the plane of the slit;

a grating having lines perpendicular to a meridian plane of the spectrograph, and being suitable for diffracting the light beam transmitted through the inlet slit and generating a diffracted light beam and a spectrum in an image plane;

a detector suitable for detecting the light beam diffracted by the grating, the detector including a window through which the light beam diffracted by the grating is transmitted, wherein a part of the diffracted light beam generates reflections on the window or between the window and a sensitive surface of the detector contained in a detection plane;

wherein the grating is positioned such that an image plane of the diffracted spectrum is inclined with respect to a detection plane of the detector.

2. The inclined-slit spectrograph of claim 1, wherein the inlet slit is arranged between the light source and the grating.

3. The inclined-slit spectrograph of claim 2 wherein the inlet slit is inclined in a plane perpendicular to a direction of the light beam emitted by the light source.

4. The inclined-slit spectrograph of claim 3 wherein the inlet slit is inclined by an angle theta with respect to lines of the grating, the angle theta being greater than 0° and smaller than 90°.

5. The inclined-slit spectrograph of claim 1 further comprising a selector filter arranged between the grating and the detector.

6. The inclined-slit spectrograph of claim 1 wherein the detection plane of the detector is inclined by an angle alpha defined in a plane orthogonal to the detection plane with respect to an image plane of the grating.

7. The inclined-slit spectrograph of claim 6 wherein the angle alpha is greater than 0° and smaller than 45°.

8. The inclined-slit spectrograph of claim 1 wherein the grating comprises a calculated grating determined so that the spectrum it produces is inclined by an angle beta with respect to the detection plane of the detector.

9. The inclined-slit spectrograph of claim 8 wherein the detector is inclined by an angle alpha so that the detection plane of the detector is inclined by the angle alpha with respect to an image plane of the grating, the angle alpha being defined in a plane orthogonal to the detection plane.

* * * * *